United States Patent
Kuroda et al.

(10) Patent No.: US 7,123,551 B2
(45) Date of Patent: *Oct. 17, 2006

(54) OPTICAL DEVICE WITH OPTICAL RECORDING MEDIUM HAVING TRANSPARENT HEAT RADIATING LAYER

(75) Inventors: Yuji Kuroda, Tokyo (JP); Koichiro Kishima, Kanagawa (JP); Isao Ichimura, Tokyo (JP); Kiyoshi Osato, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/095,510

(22) Filed: Apr. 1, 2005

(65) Prior Publication Data

US 2005/0180307 A1   Aug. 18, 2005

Related U.S. Application Data

(63) Continuation of application No. 09/606,885, filed on Jun. 29, 2000, now Pat. No. 6,934,224.

(30) Foreign Application Priority Data

Jul. 9, 1999   (JP)   ................................. 11-196746

(51) Int. Cl.
G11B 11/00   (2006.01)

(52) U.S. Cl. .................... 369/13.34; 369/283; 369/286

(58) Field of Classification Search ............. 369/13.34, 369/283, 286; 428/64.1; G11B 11/00, 7/02; B32B 3/02
See application file for complete search history.

(56) References Cited

U.S. PATENT DOCUMENTS

| | | | |
|---|---|---|---|
| 4,711,821 A | 12/1987 | Kikuchi et al. | |
| 4,794,560 A | 12/1988 | Bell et al. | |
| 5,234,737 A | 8/1993 | Ueno et al. | |
| 5,253,313 A | 10/1993 | Kishima | |
| 5,272,667 A | 12/1993 | Yamada et al. | |
| 5,272,684 A | 12/1993 | Takeuchi et al. | |
| 5,368,908 A | 11/1994 | Ohta et al. | |
| 5,431,975 A | 7/1995 | Honguh et al. | |
| 5,631,056 A | 5/1997 | Kawanishi et al. | |
| 5,646,924 A | 7/1997 | Nonoyama et al. | |
| 5,916,730 A | 6/1999 | Ide et al. | |
| 6,042,921 A | 3/2000 | Yoshinari et al. | |
| 6,064,642 A | 5/2000 | Okubo | |
| 6,069,853 A | 5/2000 | Novotny et al. | |

(Continued)

FOREIGN PATENT DOCUMENTS

EP   0 365 333   4/1990

(Continued)

OTHER PUBLICATIONS

MAT (machine assisted translation) of JP 11-126387.

(Continued)

*Primary Examiner*—Aristotelis M. Psitos
(74) *Attorney, Agent, or Firm*—Oblon, Spivak, McClelland, Maier & Neustadt, P.C.

(57) ABSTRACT

An optical recording medium and an optical recording and reproduction device including the same, wherein the optical recording medium comprises a substrate, a reflective layer formed on the substrate, a recording layer formed on the reflective layer, a first protective layer formed on the recording layer and a transparent heat radiating layer formed on the first protective layer for promoting dispersion of heat from the recording layer, and light is focused on the recording layer from an optical system via a side at which the first protective layer is formed to prevent heat buildup, erasure of recorded signals and damage to the optical recording medium.

6 Claims, 9 Drawing Sheets

U.S. PATENT DOCUMENTS

| | | |
|---|---|---|
| 6,096,399 A | 8/2000 | Yoshinari et al. |
| 6,160,769 A | 12/2000 | Ohnuki et al. |
| 6,203,877 B1 | 3/2001 | Oklbo |
| 6,205,092 B1 | 3/2001 | Yamaguchi et al. |
| 6,217,968 B1 | 4/2001 | Maro et al. |
| 6,221,455 B1 | 4/2001 | Yasuda et al. |
| 6,231,945 B1 | 5/2001 | Miyamoto et al. |
| 6,238,781 B1 | 5/2001 | Anderson et al. |
| 6,243,327 B1 | 6/2001 | Nakaoki et al. |
| 6,333,900 B1 | 12/2001 | Maro et al. |
| 6,449,239 B1 | 9/2002 | Uno et al. |

FOREIGN PATENT DOCUMENTS

| | | |
|---|---|---|
| EP | 0626682 | 11/1994 |
| EP | 0 984 443 | 3/2000 |
| JP | 11-126387 | 11/1999 |
| JP | 200076703 | 3/2000 |
| WO | 99/27532 | 6/1999 |

OTHER PUBLICATIONS

Patent Abstracts of Japan, JP 11-007657, Jan. 12, 1999.

OPTICAL DEVICE WITH OPTICAL RECORDING MEDIUM HAVING TRANSPARENT HEAT RADIATING LAYER

CROSS-REFERENCE TO RELATED APPLICATIONS

This application is a continuation application of, and claims priority to, Ser. No. 09/606,885, filed Jun. 29, 2000, now U.S. Pat. No. 6,934,224, issued Aug. 23, 2005, and claims priority to Japanese Patent Application 11-196746 filed Jul. 9, 1999.

BACKGROUND OF THE INVENTION

1. Field of the Invention

The present invention relates to an optical recording medium and an optical recording and reproduction device, more particularly an optical recording medium used at a near field which is able to prevent heat buildup at the surface of the optical recording medium due to focusing of light when recording or reproducing and the consequent signal loss or damage to the optical recording medium and an optical recording and reproduction device including the same.

2. Description of the Related Art

Up to now, a hard disk or other magnetic recording medium has been used in a state with a head for recording and reproduction brought into extremely close proximity to the disk or other medium for the purpose of obtaining good signal characteristics. As opposed to this, a phase change type optical disk, magneto-optical disk, or other optical recording medium is used in a state with the optical system or head for recording and reproduction separated from the recording medium by a predetermined distance.

However, in recent years, in the devices used for optical recording media, the system of bringing the optical system or head into close proximity, for example, 200 nm with the disk (near field) has begun to be employed for the purpose of increasing a numerical aperture (NA) of the optical system and thereby increasing a recording density of the disk.

As an optical recording medium device used at the near field, for example, there are an optical hard disk structured with a lens mounted on a slider, an optical disk device with a lens made movable by an electromagnetic actuator, etc. In these devices, light for recording and reproduction is focused on the recording medium by an optical system comprised of a plurality lenses including at least an objective lens and a solid immersion lens (SIL). Due to this, an NA of over 1 has been obtained.

Figure 1:
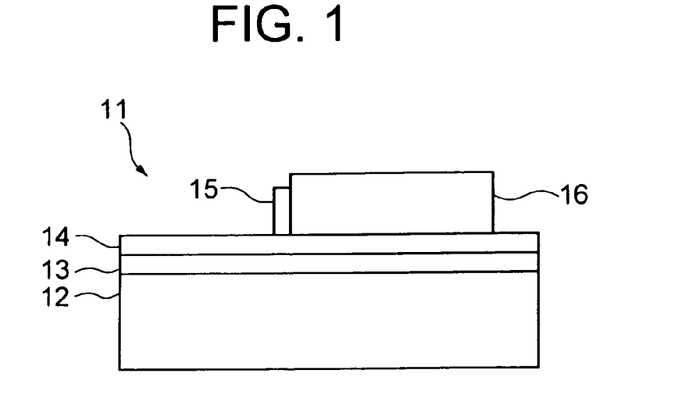
FIG. 1 is a schematic view of a magnetic recording device (hard disk) of related art.

FIG. 1 is a schematic view of a hard disk. The disk 11 is structured with a recording layer 13 and a lubrication film 14 stacked on a substrate 12. A recording and reproducing head 15 for changing the magnetization of the recording layer 13 is mounted on a slider 16 and movable in the direction of the disk plane. The lubrication film 14 is provided for preventing abrasion of the head 15 and the disk 11. The lubrication film 14 is formed, for example, by coating a fluorine compound. In the case of an optical disk, consideration of optical conditions is required for a layer formed on a recording layer, but the lubrication film 14 of a hard disk does not require consideration of optical conditions. Therefore, it can be relatively easily formed.

Figure 2:
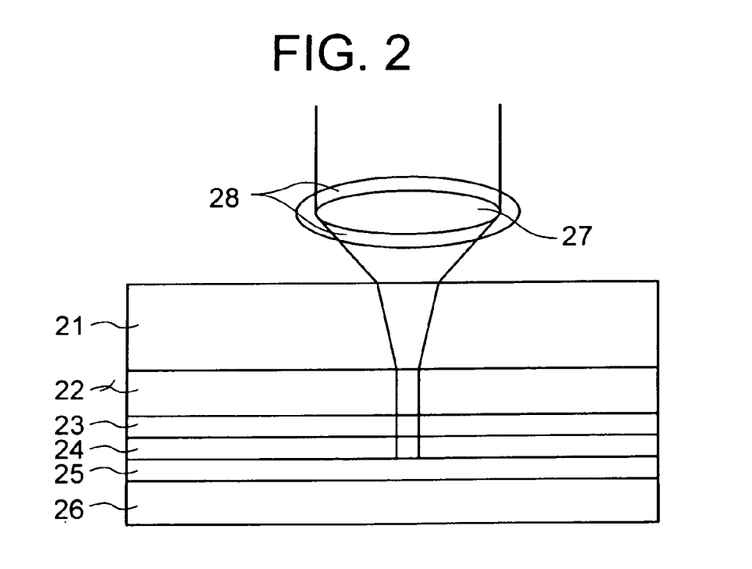
FIG. 2 is a cross-sectional view of an optical recording medium of related art used in a state wherein the disk and the optical system are sufficiently separated.

FIG. 2 is a schematic view of an optical disk with a long distance between an optical system or head and the disk (far-field optical disk). The optical disk of FIG. 2 is for example a phase change type optical disk or a magneto-optical disk and is structured with a dielectric protective layer 22, a recording layer 23, a dielectric protective layer 24, a reflective film 25, and a resinous protective layer 26 sequentially stacked on a substrate 21.

In the case of a phase change type optical disk, a material changing in phase by focusing of light is used for the recording layer 23. Both surfaces of the recording layer 23 are protected by the dielectric protective layers 22, 24 comprised of for example ZnS—$SiO_2$. These surfaces are further protected by the substrate 21 or the resinous protective layer 26.

In the case of a magneto-optical disk, a material changing in magnetization state by focusing of light is used for the recording layer 23.

The optical disk of FIG. 2 has a much longer distance between a lens 27 and the disk than that of a hard disk. A film for dealing with friction or collision between the lens 27 (or head) and the disk is usually preferable, but not necessary.

Figure 3:
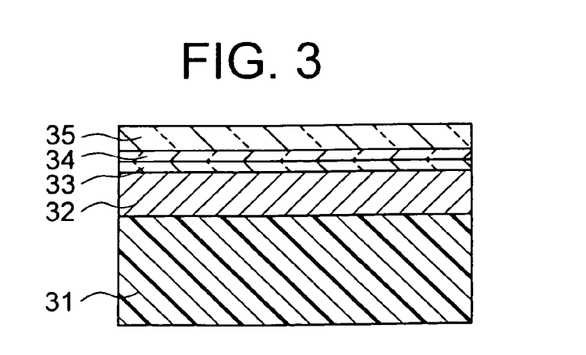
FIG. 3 is a cross-sectional view of a near-field optical recording medium of related art.

FIG. 3 is a cross-sectional view of an optical disk used in the near field. It is structured by a reflective layer 32, a second dielectric layer 33, a recording layer 34, and a first dielectric layer 35 sequentially stacked on a substrate 31. In the case of the optical disk shown in FIG. 2, light is focused from the side at which the transparent substrate 21 is formed. On the other hand, in the case of the optical disk for near-field use shown in FIG. 3, light is focused from the side at which the first dielectric layer 35 is formed. Due to this, the increase in the coma along with an increase in the NA is moderated.

In the optical disk of FIG. 3, the four layers of the first dielectric layer 35, the recording layer 34, the second dielectric layer 33, and the reflective layer 32 are optimized in design for obtaining good signal characteristics for light striking the disk surface perpendicularly.

On the other hand, in the case of a near-field optical disk device having a short distance between the head and the disk as described above, the risk of collision of the lens and the rest of the optical system (or head) with the disk becomes extremely high. However, it is very difficult to uniformly coated a lubricating substance such as used for the lubrication film 14 of the hard disk on the surface of an optical disk to form a thin film satisfying the optical conditions. Also, in the case of a near-field configuration, the fluorine material used for the lubrication film 14 of a hard disk cannot be used because the refractive index is too low. There are few other suitable materials.

When an AR coating is provided on the surface of the lens, once the AR (Antireflecting) coating at the lens side is damaged due to collision, the recording and reproduction influenced by the damage at all times. That is, a change of the optical characteristics of the entire device is caused. However, it is difficult to find a suitable coating material resistant to damage by collision as the material for the AR coating.

Further, according to the conventional near-field optical disk shown in FIG. 3, as the protective layers 33, 35 of the recording layer 34, a ZnS—$SiO_2$ layer having a low heat conductivity is often formed. Therefore, when focusing laser light at the time of recording and/or reproduction, heat builds up between the optical system and the recording layer. The heat causes the problems of loss of signals recorded on the optical disk or damage to the disk itself.

Figure 4A:
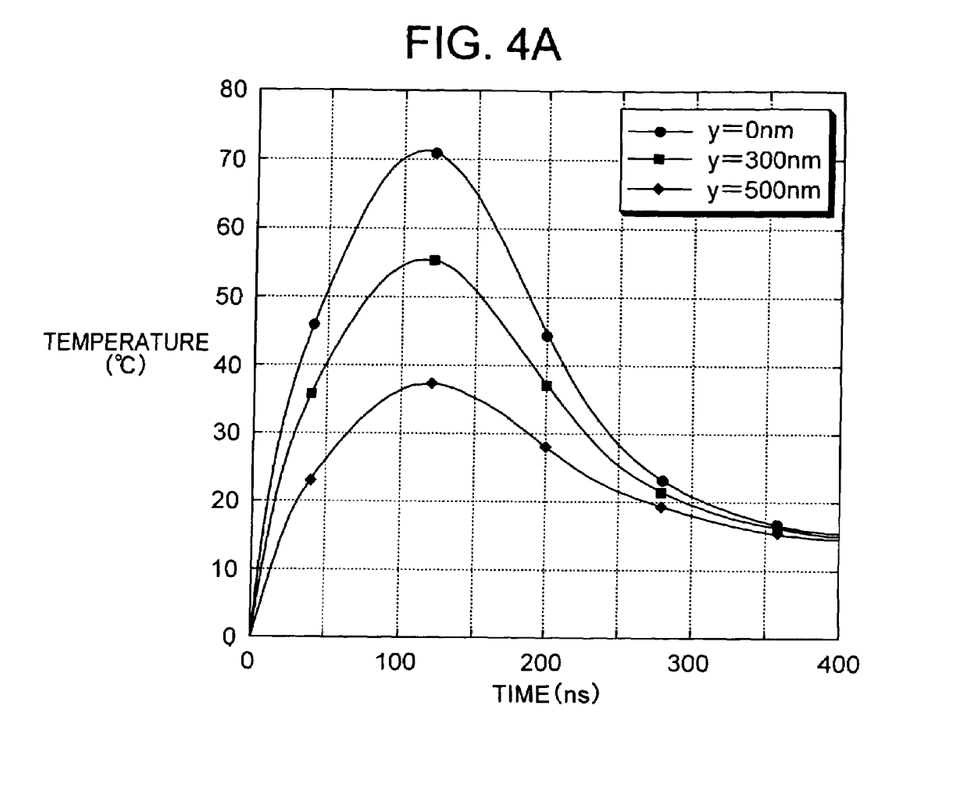
FIG. 4A is a view of characteristics of the near-field optical recording medium of related art showing the temperature rise of the recording layer due to focusing of laser light and FIG. 4B is a coordinates defining each axis.
Figure 4B:
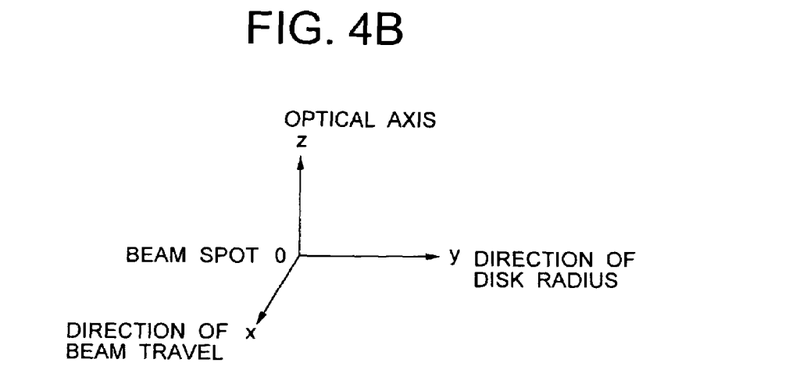

FIG. 4A shows a result of calculating the temperature rise due to focusing of laser light when making the optical disk the film configuration shown in FIG. 3. In FIG. 4A, the temperature of the recording layer is plotted against time after focusing of the laser light. As shown in FIG. 4B, the disk surface was set as an x-y plane, the beam spot was set as the origin O, and the direction of the optical axis of the laser light was set as a z-axis. The direction x of beam travel is the direction of relative movement of the beam spot on the disk along with disk rotation. Therefore, y corresponds to a distance from the beam spot in the direction of the disk radius. The calculation was performed setting y as 0 nm, 300 nm, and 500 nm. The intensity of the laser light was assumed to be 0.2 mW or the same level as the reproducing light.

The specific film configuration was made as follows (below, this film configuration is used as a comparative example for the present invention). The reflective layer 32 was made an Al-alloy layer of a thickness of 120 nm. The second dielectric layer 33 was made a $ZnS$—$SiO_2$ layer having a refractive index n=2 and a thickness of 20 nm. The recording layer 34 was made a Ge—Sb—Te layer having a refractive index n=3.9, a quenching coefficient k=3.5, and a thickness of 20 nm. The first dielectric layer 35 was made a $ZnS$—$SiO_2$ layer having a refractive index n=2 and a thickness of 100 nm. An optical system (lens) arranged in proximity to the optical disk was made a refractive index n=1.8.

As shown in FIG. 4A, although the intensity of the laser light is sufficiently smaller than the intensity of the recording light, the recording layer reaches a high temperature. Also, during a certain time until the rising temperature goes down, heat is built up at the recording layer.

Generally, it is necessary to reduce the distance between the lens and the disk for increasing the reproduced signal level. When a recording and reproducing system, in which the lens and the disk are brought into extremely close proximity, is used, the recording layer is easily damaged due to collision of the lens with the surface of the disk.

However, according to the configuration shown in FIG. 3, the first dielectric layer 35, that is, a thin layer of for example $ZnS$—$SiO_2$ or SiN, is formed on the outermost layer of the disk. Therefore, when the lens and the disk collide, the first dielectric layer 35 and the recording layer 34 below the layer 35 are readily damaged.

Also, when only the extremely thin first dielectric layer 35 is formed on the recording layer 34, local light absorption easily occurs at the surface of the disk. If ablation occurs due to laser light at the time of recording or reproduction, the disk will be damaged and the lens contaminated by the deposition of the disk material on the lens surface.

OBJECTS AND SUMMARY OF THE INVENTION

An object of the present invention is to provide an optical recording medium used in the near field and able to prevent heat buildup due to the focusing of laser light and the consequent loss of signals recorded on the optical recording medium and damage to the optical recording medium and an optical recording and reproduction device including the medium.

Another object of the present invention is to provide an optical recording medium used for the near field and preventing damage due to collision with an optical system and an optical recording and reproduction device including the medium.

According to a first aspect of the present invention, there is provided an optical recording medium comprising a substrate; a recording layer formed on the substrate; a first protective layer formed on the recording layer; and a transparent heat radiating layer formed on the first protective layer for promoting dispersion of heat from the recording layer; light being exposed on the recording layer via a side at which the heat radiating layer is positioned to thereby perform recording and/or reproduction of information.

Preferably, said optical recording medium is used in near field condition. Preferably, the near field condition comprises a space between the heat radiating layer and an optical system of about 200 nm or less. Preferably, the optical system comprises a solid immersion lens (SIL).

Preferably, the heat radiating layer has a higher heat conductivity than the first protective layer. More preferably, the heat radiating layer has a heat conductivity of about 0.1 (W/cmK) or more.

More preferably, the heat radiating layer has a quenching coefficient with respect to the light used for recording and reproducing of less than about 0.1.

Preferably, the heat radiating layer comprises at least one of BN, AlN, SiN, SiC, $Ta_2O_5$, and diamond-state carbon.

Preferably, the heat radiating layer comprises a multilayer film comprising a plurality layers having substantially same optical constants and having different heat constants stacked together. Preferably, a light reflecting layer comprised of metal or semimetal is formed between the substrate and the recording layer. Preferably, the optical recording medium further comprises an antireflection layer on the heat radiating layer. Preferably, the optical recording medium further comprises an antireflection layer between the heat radiating layer and the recording layer.

Preferably, the optical recording medium further comprises a second protective layer between the substrate and the recording layer.

Preferably, the recording layer comprises a material undergoing a phase change and changing in a complex index of refraction due to the focusing of light.

Alternatively, the recording layer preferably comprises a material changing in a magnetization state by using the focusing of light and enabling detection of the change as a change of a polarization state.

Alternatively, the recording layer preferably changes in a complex index of refraction or shape due to light with respect to the wavelength of the reproducing light.

Due to this, heat built up at the recording layer due to the focusing of laser light is dispersed to the surface of the optical recording medium via the heat radiating layer. Therefore, it is possible to prevent a rise in temperature at the surface of the optical recording medium due to focusing of laser light. Due to this, it is possible to maintain the signals recorded on the optical recording medium and prevent damage to the optical recording medium due to heat.

Also, according to the optical recording medium of the present invention, a layer comprised of Al or other inorganic material is formed at the outermost layer of the optical recording medium as the heat radiating layer. Therefore, the surface hardness is high and the recording layer of the optical recording medium is resistant to damage even when a head or optical system and the optical recording medium collide.

Further, according to the optical recording medium of the present invention, by forming the heat radiating layer covering the surface of the optical recording medium, ablation of the material comprising the optical recording medium is prevented and destruction of the film along with the elapse of time due to ablation can be prevented. Therefore, the long-term reliability of the optical recording medium can be improved.

Also, in the optical recording medium of the present invention, by making the heat radiating layer multilayer and suitably controlling the thicknesses of layers comprising the heat radiating layer, it becomes possible to control the optical characteristics and the heat characteristics of the heat radiating layer at the same time.

According to a second aspect of the present invention, there is provided an optical recording and reproduction device comprising a light source, an optical recording medium, and an optical system for focusing light from the light source on the optical recording medium, characterized in that the optical recording medium comprises a substrate, a recording layer formed on the substrate, a first protective layer formed on the recording layer, and a heat radiating layer formed on the first protective layer, that light from the optical system is exposed to the recording layer via a side with the heat radiating layer formed for recording and reproducing information, and that the heat radiating layer promotes dispersion of heat from the recording layer.

Preferably, a space between the heat radiating layer and the optical system comprises a near field. More preferably, the space is about 200 nm or less. More preferably, the optical system comprises a solid immersion lens (SIL).

Preferably, the heat radiating layer has a higher heat conductivity than the first protective layer. More preferably, the heat radiating layer has a heat conductivity of about 0.1 (W/cmK) or more. More preferably, the heat radiating layer has a quenching coefficient with respect to the light used for recording and reproducing of less than about 0.1.

Preferably, the heat radiating layer comprises at least one of BN, AlN, SiN, SiC, $Ta_2O_5$, and diamond-state carbon.

Preferably, the heat radiating layer is a multilayer film comprising a plurality of layers having substantially same optical constants and having different heat constants stacked together. Preferably, a light reflecting layer comprising metal or semimetal is formed between the substrate and the recording layer. Preferably, the optical recording and reproduction device further comprises an antireflection layer on the heat radiating layer in the optical recording medium. Preferably, the optical recording and reproduction device further comprises an antireflection layer between the heat radiating layer and the recording layer in the optical recording medium.

Preferably, the optical recording and reproduction device further comprises a second protective layer between the substrate and the recording layer in the optical recording medium.

Preferably, the recording layer comprises a material undergoing a phase change and changing in a complex index of refraction due to light.

Alternatively, the recording layer preferably comprises a material changing in a magnetization state by using light and enabling detection of the change as a change of a polarization state.

Alternatively, the recording layer preferably comprises an organic dye material changing in a complex index of refraction or shape due to light with respect to a wavelength of the reproducing light.

Due to this, a rise in temperature of the optical recording medium due to focusing of laser light can be prevented and it is made possible to maintain signals recorded on the optical recording medium and prevent damage to the optical recording medium due to heat.

Also, since the heat radiating layer is formed at the outermost layer of the optical recording medium, the surface hardness becomes high and the optical recording medium is resistant to damage when a head or optical system and the optical recording medium collide. Also, ablation due to focusing of laser light is also prevented. Therefore, it is possible to improve the long-term reliability of the optical recording and reproduction device.

Also, when an antireflection film is formed on the optical recording medium used for the optical recording and reproduction device of the present invention, it becomes unnecessary to provide an antireflection coating on the surface of the optical system. Therefore, it is possible to prevent damage of the antireflection coating and an effect on recording and reproduction.

According to a third aspect of the present invention, there is provided an optical recording and reproduction device comprising a light source, an optical recording medium, and an optical system focusing light from the light source to the optical recording medium, wherein the optical recording medium comprises a substrate, a phase change recording layer formed on the substrate and comprised of a material undergoing a phase change and changing in a complex index of refraction by said focusing of light, a first protective layer formed on the phase change recording layer, and a heat radiating layer formed on the first protective layer, light from the optical system is exposed to the phase change recording layer via a side with the heat radiating layer formed for recording and reproducing information, and the heat radiating layer promotes dispersion of heat from the phase change recording layer.

According to a fourth aspect of the present invention, there is provided an optical recording and reproduction device comprising a light source, an optical recording medium, and an optical system focusing light from the light source to the optical recording medium, wherein the optical recording medium comprises a substrate, a recording layer formed on the substrate, a first protective layer formed on the recording layer, and a heat radiating layer formed on the first protective layer, light is focused from the optical system comprising a near field with the numerical aperture (NA) more than 1 to the recording layer via a side with the heat radiating layer formed for recording and reproducing information, and the heat radiating layer promotes dispersion of heat from the recording layer.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, embodiments of the optical recording medium and the optical recording and reproduction device of the present invention will be explained with reference to the drawings.

Figure 5:
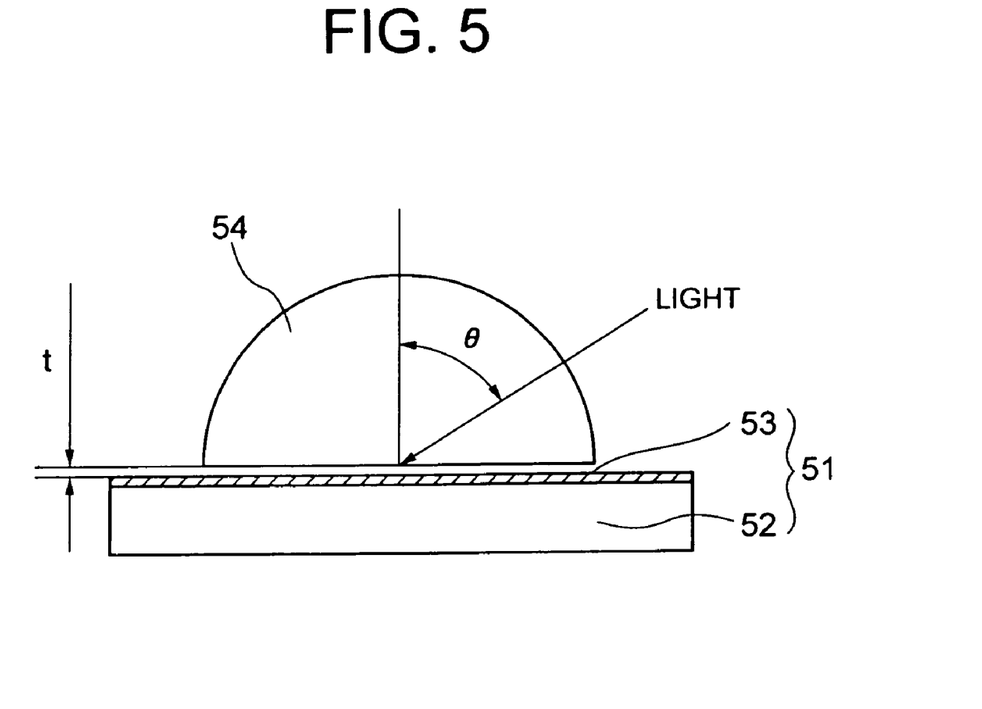
FIG. 5 is a schematic view of an arrangement of an optical recording medium of the first embodiment through the fourth embodiment of the present invention and an optical system.

First, the first embodiment of the present invention will be explained. FIG. 5 shows an arrangement of the optical recording medium of the present embodiment and an optical part (lens). As shown in FIG. 5, an optical disk 51 comprises a substrate 52 on which are formed stacked layers 53 including a recording layer. An SIL 54 is arranged at the stacked layer 53 side of the optical disk 51. The distance t between the surface of the stacked layers 53 and the SIL 54 is extremely narrow, usually 200 nm or less. Since light collected by an objective lens (not shown) enters the SIL 54, the NA becomes high. Also, θ represents the incident angle of the light focused on the optical disk 51.

Figure 6:
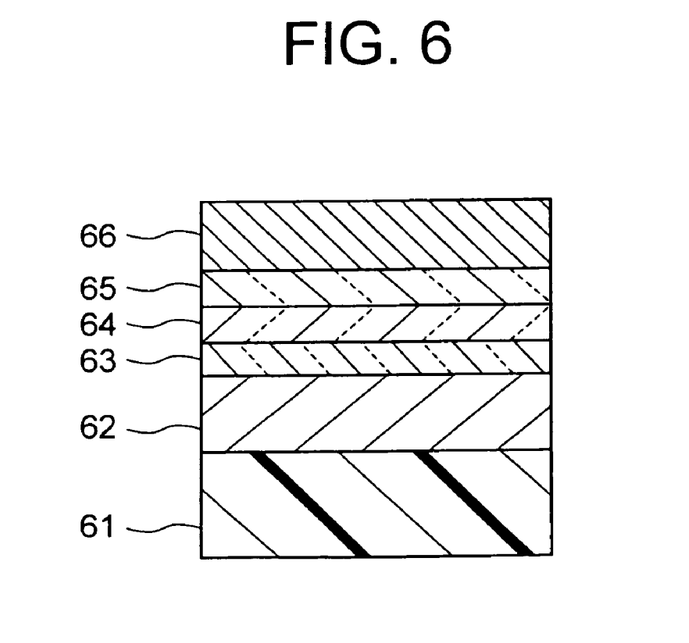
FIG. 6 is a cross-sectional view of an optical recording medium of the first embodiment through the third embodiment of the present invention.

FIG. 6 is a cross-sectional view of the optical recording medium of the present embodiment. The present embodiment is assumed as a phase change type optical disk used for light of a wavelength of 650 nm. The optical disk shown in FIG. 6 is structured with a reflective layer 62, a second dielectric layer 63, a recording layer 64, and a first dielectric layer 65 sequentially stacked on a substrate 61 and, further, a heat radiating layer 66 formed on them.

On the optical disk of the present embodiment, laser light is focused from the side at which the heat radiating layer 66 is formed. The laser light strikes the optical disk with the line passing through the center of the beam diameter (beam waist) perpendicular to the surface of the disk.

In the optical disk of FIG. 6, the five layers of the heat radiating layer 66, the first dielectric layer 65, the recording layer 64, the second dielectric layer 63, and the reflective layer 62 satisfy an enhancement condition of the light perpendicularly striking the disk surface (perpendicularly incident component). The design is optimized for obtaining good signal characteristics for the perpendicularly incident component.

According to the film configuration of the present embodiment, as the reflective layer 62, for example, an Al-alloy layer of a thickness of 120 nm is used. As the second dielectric layer 63, a ZnS—SiO$_2$ layer having a refractive index n=2 and a thickness of 20 nm is used. As the recording layer 64, a Ge—Sb—Te layer having a refractive index n=3.9, a quenching coefficient k=3.5, and a thickness of 20 nm is used. As the first dielectric layer 65, a ZnS—SiO$_2$ layer having a refractive index n=2 and a thickness of 50 nm is used. As the heat radiating layer 66, an AlN layer having a refractive index n=2 and a thickness of 50 nm is used. The optical system (lens) arranged next to the optical disk is made one with a refractive index n=1.8.

Below, each layer comprising the optical disk of the present embodiment will be explained in detail.

As the substrate 61, for example, a plastic substrate comprised of polycarbonate (PC) or polymethyl methacrylate (PMMA) and other acryl-based resins and a glass substrate etc. may be used.

As the reflective layer 62 on the substrate 61, for example an Al layer or Al-alloy layer is used. The thickness of the reflective layer 62 is set at, for example, about 50 to 200 nm. The reflective layer 62 not only reflects the light focused on the optical disk, but also functions to promote the dispersion of heat from the recording layer 64. While the temperature of the recording layer 64 rises due to absorption of light, the reflective layer 62 has a high heat conductivity since it is usually composed of a metal layer and acts as a kind of heat sink. As the material of the reflective layer 62, as long as the material has a predetermined reflectance and heat conductivity, it is also possible to use a semimetal, a compound of metal or semimetal, and semiconductors and their compounds in addition to metal.

The second dielectric layer 63 functions as a protective layer of the phase changing recording layer 64. The second dielectric layer 63 need not necessarily be formed, for example, when not rewriting on the optical disk and in other cases.

As the recording layer 64 on the second dielectric layer 63, a material changing in phase reversibly between a crystal and amorphous state by focusing of a laser may be used. For example, chalcogens or chalcogen compounds, specifically, a system including Te, Se, Ge—Te, Ge—Sb—Te, Ge—Te Sb—Te, In—Sb—Te, Ag—In—Sb—Te, Au—In—Sb—Te, Ge—Sb—Te—Se, In—Sb—Se, Bi—Te, Bi—Se, Sb—Se, Sb—Te, Ge—Sb—Te—Bi, Ge—Sb—Te—Co, Ge—Sb—Te—Au, Zn—Ge—In—Sb—Te, or such a system doped with nitrogen, oxygen, or another gas additive or doped with Pd can be mentioned.

The first dielectric layer 65 on the recording layer 64 functions as a protective layer of the phase changing recording layer 64.

For the heat radiating layer 66 on the first dielectric layer 65, a material having a higher heat conductivity than the first dielectric layer 65 is used. Specifically, a material having a heat conductivity of almost 0.1 (W/cmK) or more and a quenching coefficient k of less than 0.1 with respect to the laser light used for recording and/or reproducing is preferably used. For example, BN, SiN, SiC, Ta$_2$O$_5$, diamond-state carbon, and mixtures of these can be preferably used as the material of the heat radiating layer 66, in addition to Al described above. Also, the thickness of the heat radiating layer 66 is appropriately set within a range where the heat radiating layer 66 has transparency.

According to the above optical recording medium of the present embodiment, since the heat radiating layer having a high heat conductivity is formed between the recording layer of the disk and the optical system, the temperature rise at the disk surface due to the focusing of laser light can be prevented. Due to this, it is made possible to maintain signals recorded on the optical disk and prevent damage to the optical disk by heat.

Also, according to the optical recording medium of the present embodiment, since a layer composed of AlN or another inorganic material is formed at the outermost layer of the disk as the heat radiating layer 66, the surface hardness is high and the recording layer of the optical disk is not easily damaged when the head or optical system and the disk collide.

According to the optical recording medium of the present embodiment, since the heat radiating layer 66 is formed covering the disk surface, ablation of the disk material is prevented and destruction of the film along with the elapse of time due to ablation can be prevented.

Also, when the optical recording medium of the present embodiment is combined with a light source and a near-field high NA optical system, the optical recording device of the present invention can be configured.

Figure 7:
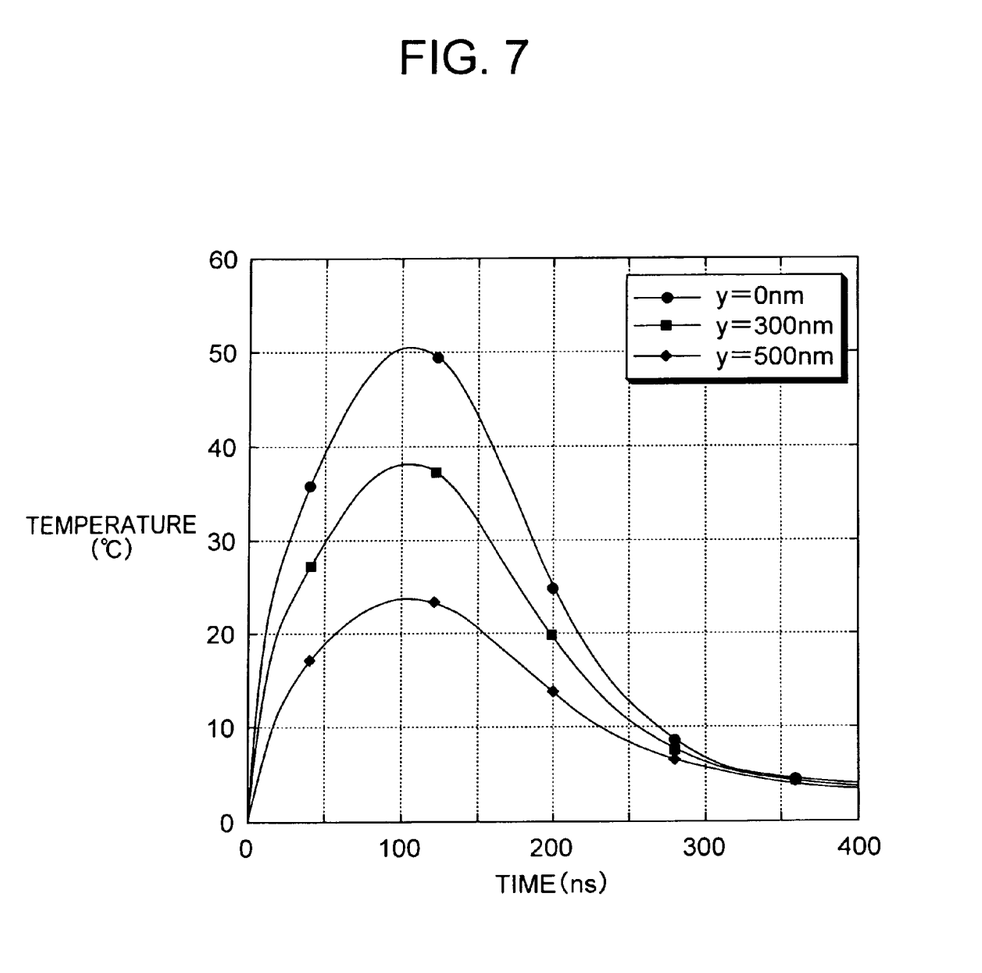
FIG. 7 is a view of the characteristic of the optical recording medium of the second embodiment of the present invention showing the temperature rise of the recording layer due to focusing of laser light.

Next, the second embodiment of the present invention will be explained. FIG. 7 shows the results of calculating the temperature rise in the phase change type optical disk of the above first embodiment due to focusing of laser light. In FIG. 7, the temperature of the recording layer is plotted against the time after the focusing of the laser light. As described above, the disk surface was made the x-y plane, the beam spot was made the origin O, and the direction of the optical axis of the laser light was made the z-axis (see FIG. 4B). The direction x of beam travel is the direction of relative movement of the beam spot on the disk along with disk rotation. Therefore, y corresponds to the distance from the beam spot in the direction of disk radius. The calculation was performed setting y as 0 nm, 300 nm and 500 nm. The intensity of the laser light was presumed to be 0.2 mW or the same level as the reproducing light.

When comparing FIG. 7 with the case of the film configuration of FIG. 3 (see FIG. 4A), it is found that the maximum temperature reached by the recording layer is greatly lowered by forming the heat radiating layer 66. Also, along with this, the time until the rising temperature goes down is also shortened. Thus, the quantity of heat built up at the recording layer 66 is decreased.

As described above, since the temperature rise of the recording layer is suppressed, it is made possible to keep signals recorded on the optical disk and prevent damage to the optical disk due to heat.

Figure 8:
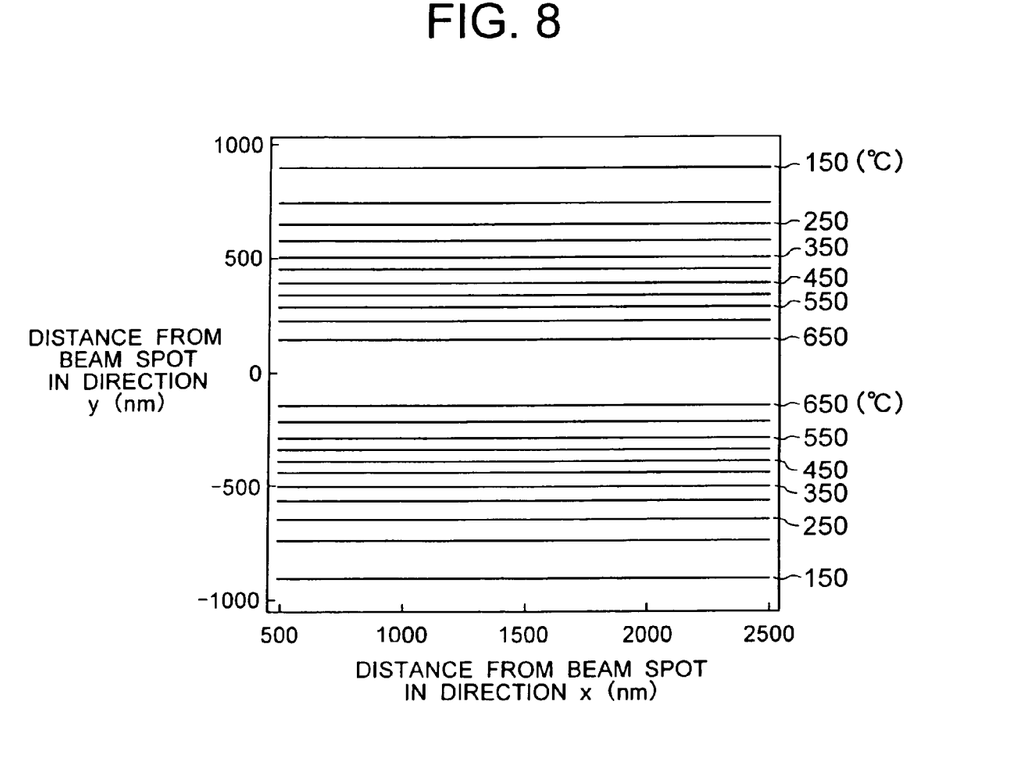
FIG. 8 is a view of the characteristics of the optical recording medium of the third embodiment of the present invention showing heat distribution from a recording mark on which laser light is focused in directions of the disk plane.
Figure 9:
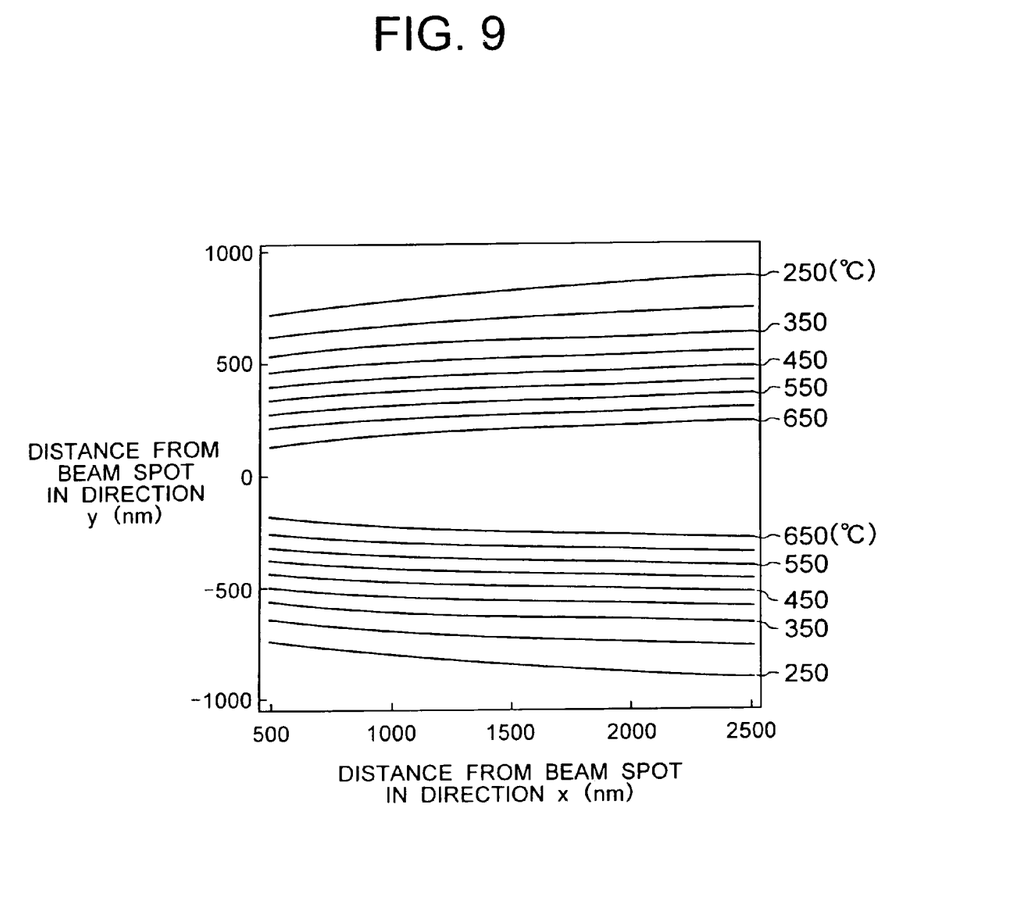
FIG. 9 is a view of characteristics of an optical recording medium of a comparative example of the third embodiment of the present invention showing heat distribution from a recording mark on which laser light is focused in directions of the disk plane.

Next, the third embodiment of the present invention will be explained. FIG. 8 shows the results of calculating the dispersion of heat from a recording mark on which laser light is focused to directions in the disk plane (laser scanning direction or disk radius direction) in the phase change type optical disk of the above first embodiment. For comparison, the results of calculation of the case of the configuration where the heat radiating layer 66 is not formed is shown in FIG. 9. The film configuration in the conventional structure is made the same as the comparative example described above (the conditions used for the calculation of FIG. 4A).

FIG. 8 and FIG. 9 correspond to top views of the heat distribution of an optical disk. When comparing FIG. 8 with FIG. 9, it is found that the dispersion of heat in the disk radius direction is suppressed by the film configuration of the present embodiment. That is, in the case of the present embodiment, dispersion of heat in a direction perpendicular to the disk surface is promoted.

Therefore, according to the optical disk of the present embodiment, when laser light is focused on any recording mark, it is possible to prevent erasure of the recording mark formed in the next track, so-called, "cross write". Due to this, it is made possible to reduce the space between tracks and improve the recording density.

Also, when an optical disk having the configuration of the present invention was actually formed and tested, it was confirmed that the reliabilities of the recording marks and the recording layer were drastically improved by forming the heat radiating layer.

Figure 10:
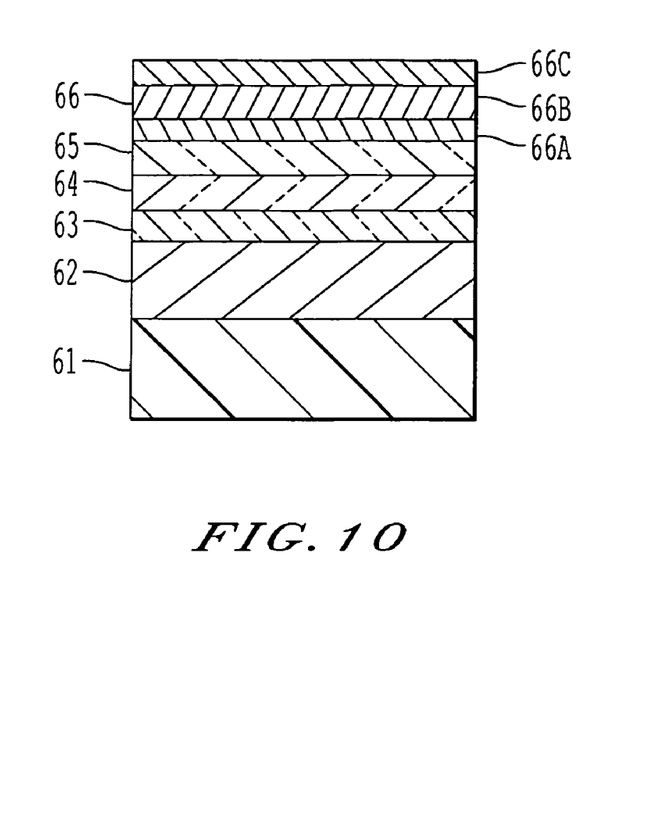
FIG. 10 is a cross-sectional view of an optical recording medium of the fourth embodiment of the present invention showing the transparent heat radiating layer as a multi-layer film including a plurality of layers stacked together.

Further, the fourth embodiment of the present invention will be explained. The heat radiating layer of the above optical disk of the present invention can also be a multilayer structure, as shown in FIG. 10. By forming stacked layers 66a, 66b, and 66c including a plurality of materials having extremely close optical constants and having different heat constants as the heat radiating layer, it is possible, in design, to control only the heat characteristics as desired while not changing the optical characteristics of the optical recording medium.

Figure 11:
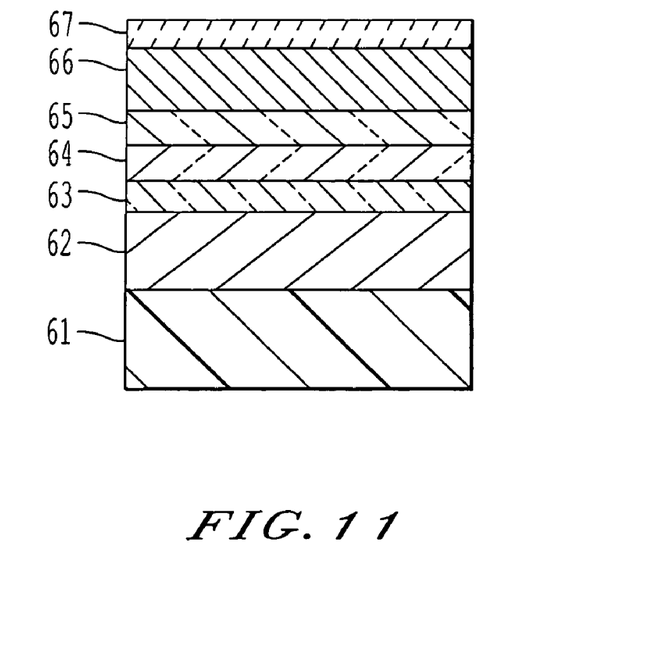
FIG. 11 is a cross-sectional view of an optical recording medium of the fourth embodiment showing an additional antireflection layer formed on the transparent heat radiating layer.
Figure 12:
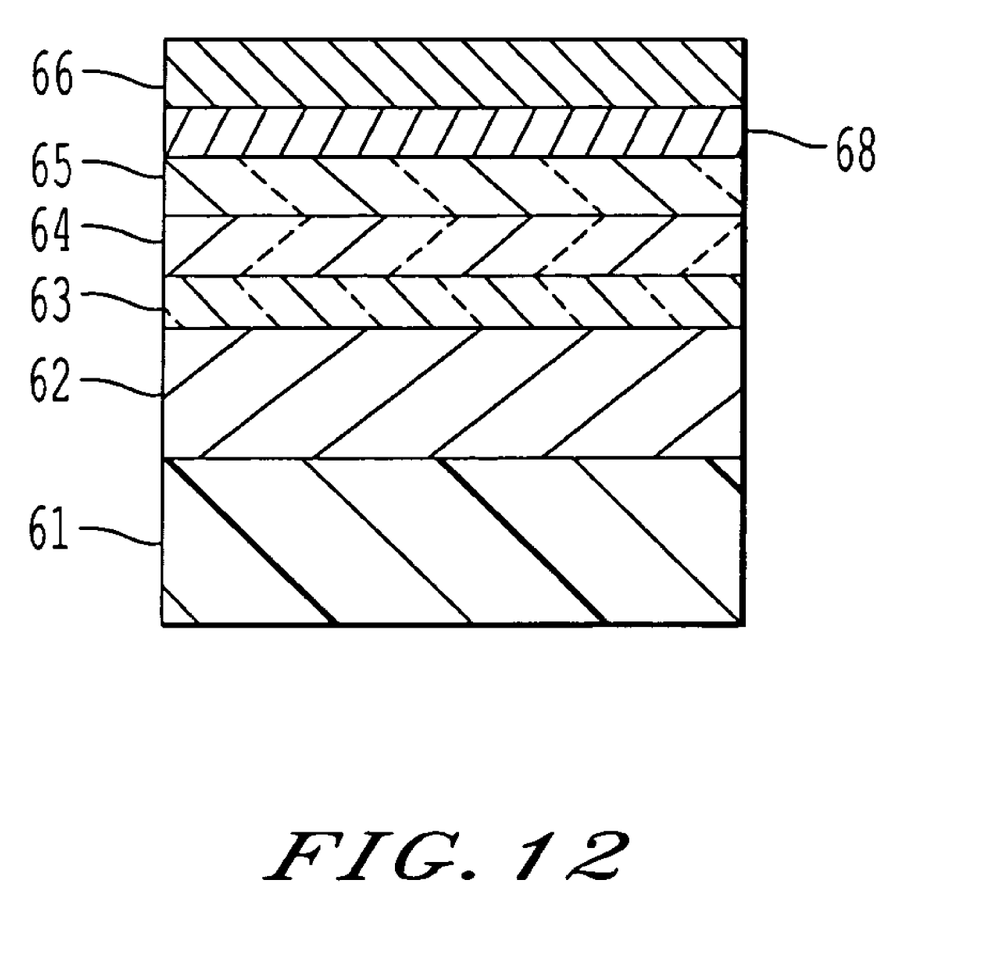
FIG. 12 is a cross-sectional view of an optical recording medium of the fourth embodiment showing an antireflection layer disposed between the transparent heat radiating layer and the recording layer.

Also, in the film configuration of the optical recording medium of the first embodiment shown in FIG. 6, it is possible to form on the heat radiating layer 66 an antireflection film 67, as shown in FIG. 11, comprising for example a silicon oxide layer, silicon nitride layer, and silicon oxide layer sequentially stacked on each other. Alternatively, an antireflection film 67 as described above can be formed between the first dielectric layer 65 and the heat radiating layer 66, as shown in FIG. 12. When the antireflection film 67 is formed in the optical recording medium, an antireflection coating on the surface of the lens becomes unnecessary. Due to this, it is possible to prevent damage to the antireflection coating on the lens surface caused by contact of the optical recording medium and the lens etc. and the damage to the electric characteristics during recording and reproduction from the lens surface.

Figure 13:
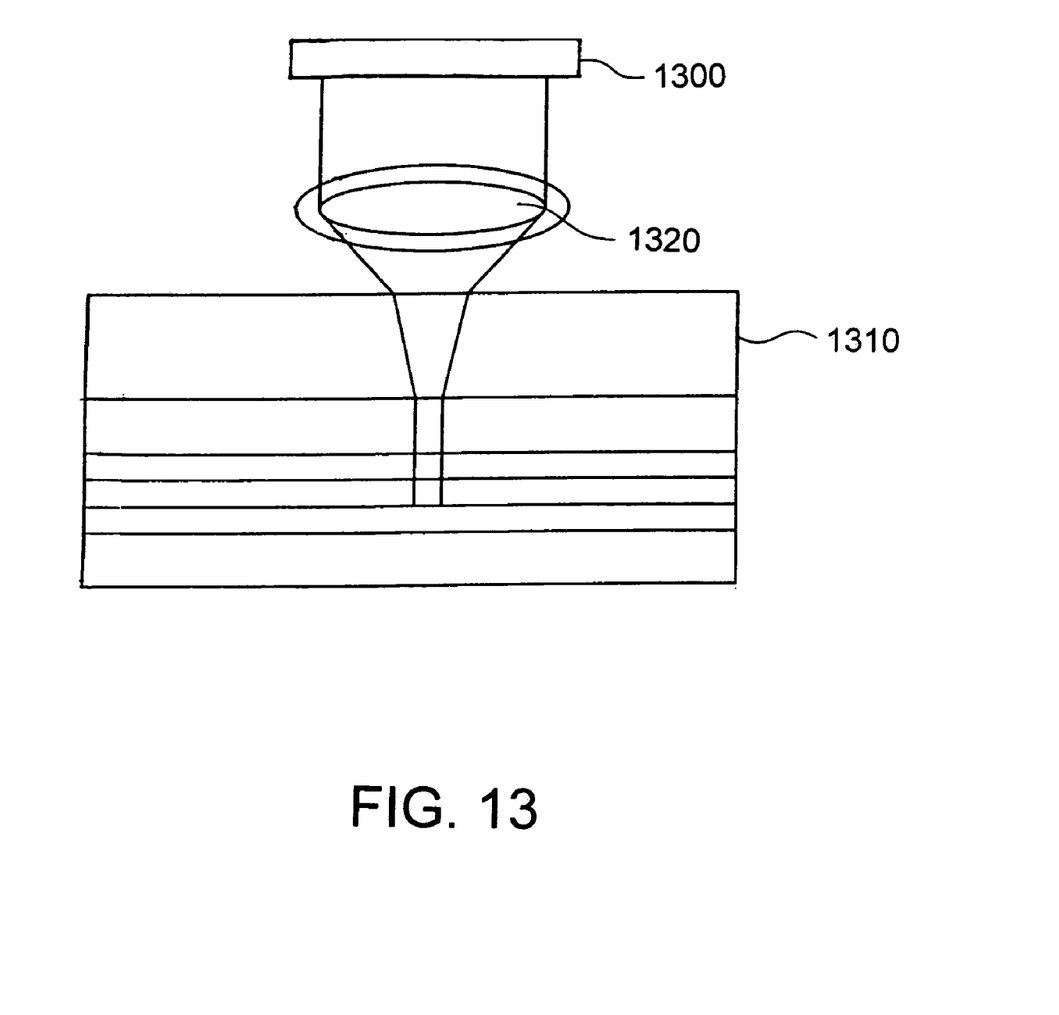
FIG. 13 is a schematic view of an optical device according to an embodiment of the present invention.

FIG. 13 shows an optical device having a light source 1300, an optical recording medium 1310, and an optical system 1320. The optical recording medium 1310 may be any of the recording mediums discussed above.

The embodiments of the optical recording medium and the optical recording and reproduction device of the present invention are not limited to the above explanation. For example, by forming by sputtering a layer of for example TbFeCo amorphous alloy or another material able to be changed in the magnetization state by using focusing of laser light, it is also possible to apply the present invention to a magneto-optical disk. Alternatively, it is also possible to apply the present invention to an optical disk using a dye in the recording layer. Also, the optical recording medium of the present invention can be either rewritable or read-only.

In addition, various modifications may be made within a range not outside the gist of the present invention.

Summarizing the effects of the present invention, according to the optical recording medium of the present invention, it is possible to prevent heat buildup in the optical recording medium due to focusing of laser light and the consequent erasure of signals recorded on the optical recording medium and damage to the optical recording medium.

Also, according to the optical recording and reproduction device of the present invention, it is possible to prevent heat buildup in the optical recording medium due to focusing of laser light and the consequent erasure of signals recorded on the optical recording medium and damage to the optical recording medium.

Further, according to the optical recording medium of the present invention, it is possible to prevent damage due to collision with an optical system.

Also, according to the optical recording and reproduction device of the present invention, it is possible to prevent damage due to collision with an optical system.

What is claimed is:

1. An optical device comprising:
   a light source;
   an optical recording medium;
   an optical system focusing light from the light source to the optical recording medium;
   the optical recording medium comprising,
   a substrate;
   a metal reflective layer formed on the substrate;
   a first protective layer of $Zn$—$SiO_2$ formed on the metal reflective layer;
   a recording layer formed on the first protective layer, the recording layer being made of a material undergoing a phase change and configured to change a complex index of refraction under said light;
   a second protective layer of $Zn$—$SiO_2$ formed on the recording layer;
   and
   the transparent heat radiating layer formed on the second protective layer and having a heat conductivity higher than the second protective layer so as to disperse heat from the recording layer, wherein the transparent heat radiating layer is a multi-layer film comprising a plurality of layers stacked together, having substantially same optical constants and having different heat constants; and
   light is focused from the optical system to the recording layer via a side of the optical recording medium closer to the heat radiating layer than to the substrate, wherein said optical recording medium is used in a near field condition.

2. The optical device of claim 1, wherein the near field condition comprises:
   a distance between the heat radiating layer and the optical system of about 200 nm or less.

3. The optical device of claim 1, wherein the optical system comprises a solid immersion lens (SIL).

4. The optical device of claim 1, wherein the heat radiating layer has a heat conductivity of about 0.1 (W/cmK) or more.

5. The optical device of claim 1, wherein the heat radiating layer has a quenching coefficient with respect to the light used for recording and reproducing of less than about 0.1.

6. The optical device of claim 1, wherein the recording layer comprises a material configured to change a magnetization state by using said light and to enable a detection of the change as a change of a polarization state.

* * * * *